(12) United States Patent
Lewis et al.

(10) Patent No.: US 8,209,410 B2
(45) Date of Patent: Jun. 26, 2012

(54) SYSTEM AND METHOD FOR STORAGE MANAGEMENT

(75) Inventors: Brian Lewis, Upminster (GB); Peter Mulberry, Redding, CT (US); Alex McMullan, Co Down (IE); Jonathan Lunt, West Hoathly (GB); Martin Barker, Hartley (GB); Gary Vincent, Layer-de-la-Haye (GB)

(73) Assignee: UBS AG, Zurich (CH)

( * ) Notice: Subject to any disclaimer, the term of this patent is extended or adjusted under 35 U.S.C. 154(b) by 965 days.

(21) Appl. No.: 12/193,363

(22) Filed: Aug. 18, 2008
(Under 37 CFR 1.47)

(65) Prior Publication Data

US 2009/0144518 A1    Jun. 4, 2009

Related U.S. Application Data

(60) Provisional application No. 60/968,240, filed on Aug. 27, 2007, provisional application No. 60/957,601, filed on Aug. 23, 2007.

(51) Int. Cl.
*G06F 15/173* (2006.01)

(52) U.S. Cl. ............ 709/223; 709/224; 707/827; 711/5; 711/100

(58) Field of Classification Search .................. None
See application file for complete search history.

(56) References Cited

U.S. PATENT DOCUMENTS

| | | | |
|---|---|---|---|
| 6,505,246 B1 | 1/2003 | Land et al. | |
| 7,181,583 B2 * | 2/2007 | Saika | 711/162 |
| 7,260,689 B1 | 8/2007 | Xu et al. | |
| 7,353,358 B1 * | 4/2008 | Marokhovsky | 711/170 |
| 7,788,302 B1 * | 8/2010 | Thakur et al. | 707/827 |
| 2002/0152305 A1 * | 10/2002 | Jackson et al. | 709/224 |
| 2004/0078376 A1 * | 4/2004 | Kusama et al. | 707/100 |
| 2005/0033929 A1 | 2/2005 | Burton et al. | |
| 2006/0047931 A1 * | 3/2006 | Saika | 711/162 |
| 2006/0271677 A1 * | 11/2006 | Mercier | 709/224 |
| 2007/0033368 A1 | 2/2007 | Taguchi et al. | |

OTHER PUBLICATIONS

International Preliminary Report on Patentability issued on Feb. 24, 2010 in related International Application No. PCT/US2008/073592.
International Search Report and Written Opinion issued on Mar. 10, 2009 in International Application No. PCT/US2008/073592.

* cited by examiner

*Primary Examiner* — Mohamed Ibrahim
(74) *Attorney, Agent, or Firm* — Pillsbury Winthrop Shaw Pittman LLP

(57) ABSTRACT

A system and method for monitoring the storage estate of an organization using an interactive website that is configured to produce and display a novel set of key performance indicators (KPIs) related to the storage estate, including KPIs related to data collected from at least one of storage area network data and network attached storage data. In one embodiment, the novel set of KPIs includes one or more of protection efficiency, application efficiency, and snapshot overhead, where protection efficiency is calculated as a ratio of logical addressable data storage volume to total physical volume of data storage for storage area network data of the organization, application efficiency is calculated as a fraction of disk storage allocated to end user devices that is actually used by the end user devices for storage area network data, and snapshot overhead is calculated as a ratio of a volume of storage allocated for replicated copies of data to allocated storage for network attached storage data.

20 Claims, 7 Drawing Sheets

SYSTEM AND METHOD FOR STORAGE MANAGEMENT

This application claims the benefit of U.S. Provisional Applications Nos. 60/957,601 and 60/968,240, filed on Aug. 23, 2007 and Aug. 27, 2007, respectively, which are incorporated by reference herein in their entirety.

BACKGROUND

1. Field of the Invention

The present invention relates generally to tools for managing and monitoring data storage.

2. Background of the Invention

Today's enterprise organizations rely on an increasingly complex data storage infrastructure whose management has emerged as a major area of challenge. An effective set of well-integrated management tools is required to keep operational costs down and get the most out of IT investments. For example, it is not uncommon in many organizations that general storage utilization is 20-30% or less across the storage estate. The range of storage area network (SAN) and network attached storage (NAS) products offered by multiple vendors has increased the complexity of managing the storage estate. Accordingly, it may be difficult to monitor or evaluate the storage infrastructure utilization in such an environment. This is especially critical for financial organizations, such as large banking institutions.

SUMMARY OF THE INVENTION

The present invention relates to an arrangement and method of operation of information technology based tools that provide a high degree of visibility of the storage estate of an organization, and that provide a method and system for benchmarking and improving utilization of the storage estate.

In one embodiment of the present invention, a storage web tool is provided for facilitating widespread access of stakeholders of an organization to detailed statistics related to the organization's storage estate. Preferably, the storage web tool comprises a web reporting tool that is configured to automatically capture data, such as storage capacity data on a periodic basis. In one embodiment of the present invention, a web reporting tool is configured to capture data from a storage capacity tool on a daily basis, for example, every 24 hours. Preferably, a web interface is provided for connection to the web reporting tool, such as a standard uniform resource locator (URL) address. Accordingly, any authorized user having web access can access the web reporting tool.

The scope of storage related information provided by the web reporting tool can include storage area networks (SANs), network attached storage (NAS), databases, and hosts attached to SAN storage, for example. The tool is configured to provide reports that may include a description of key performance indicators, capacity, applications, RAG, and database.

In one embodiment of the present invention, a method for data storage management includes organizing storage related data of an organization into a plurality of storage categories. In one example, the categories include physical storage, logical storage, allocated storage, claimed storage, storage consumption, and storage usage. Preferably, the storage related data is provided as a graphical display when a user initiates an action to receive the data. The graphical display includes a display of actual current data as it applies to each category of storage. The categories can each further include one or more subcategories. Thus, a graphical display may show a first histogram in a display that is termed "physical storage" that may be subdivided into various sub-categories, each comprising a sub-portion of the histogram and each indicating a volume of storage that is a sub-type of "physical storage", for example, "physical configured" and "physical unconfigured." Another histogram might display "logical storage" volume.

In a preferred embodiment of the present invention, a set of storage categories where each category contains sub-categories is arranged according to a storage capacity hierarchy. A first storage category comprises a first total storage capacity and includes a plurality of sub-categories that together comprise the total storage capacity of the first storage category. A second storage category comprises a second total storage capacity that is equivalent to the total storage capacity of a sub-category of the first category. Thus, the second storage category is equivalent in capacity to a sub-category of the first storage category. Similarly, if a third storage category is provided, the third storage category comprises a total storage capacity that is equivalent to the total storage capacity of a sub-category of the second category.

In one embodiment, when a plurality of storage categories is displayed, for example, on a screen or printout, a user is provided with a cascading series of first, second, third, etc., storage categories arranged according to storage capacity in increasing or decreasing storage capacity size (also referred to herein as a "waterfall"). In one specific embodiment, on one end of the series, a "total physical storage" capacity is displayed as a histogram, while on an opposite end of the series, a "used" capacity is displayed that depicts actual used storage. By displaying a series of storage capacity histograms wherein the maximum storage capacity denoted by a successive histogram corresponds to a sub-histogram of a previous histogram (that is a sub-category of the category represented by the previous histogram), the viewer is rapidly apprised of the relation between the different categories of storage and can thereby rapidly identify factors that result in the actual current storage use given a total storage capacity.

In a further step, a set of key performance indicators (KPIs) is generated based on the defined storage categories. In one embodiment of the present invention, a specific set of storage categories and a set of KPI metrics are chosen according to the type of data storage system being monitored. For example, a first set of storage categories and KPI metrics (also termed "KPIs") is applied to a SAN system evaluation, while a second set is applied to evaluation of a NAS system.

In one embodiment of the present invention, a set of SAN storage categories includes physical storage, logical, allocation, claimed status, consumption, and usage, each category organized into specific subcategories as shown in FIGS. 2 and 3a-3d; and a set of KPIs includes protection efficiency, deployment efficiency, platform efficiency, application efficiency, and overall utilization, where the protection efficiency is defined as "logical addressable" divided by the sum of "physical configured" plus "unconfigured", deployment efficiency is defined as "consumption assigned" divided by "logical addressable", platform efficiency is defined by "consumption assigned" divided by "claimed storage", application efficiency is defined as "storage used" divided by "consumption assigned", and overall utilization is defined as "used" divided by "physical capacity."

In one embodiment of the present invention, a set of NAS storage categories includes physical storage, logical storage, and usage, each category organized into specific subcategories as shown in FIGS. 4a-4d. For example, the logical category can be subdivided into "snapshot reserve", "available", "allocated", "RAID overhead", and "WAFL™ spares." In addition, a set of NAS KPIs includes protection overhead, snapshot overhead, deployment overhead, application efficiency, and overall utilization, where the protection overhead is defined as "RAID overhead" plus "logical overhead" divided by "physical capacity", snapshot overhead is defined as "logical snapshot reserve" divided by "logical volume", deployment overhead is defined as the sum of "unconfigured storage plus available" divided by "physical capacity", platform efficiency is defined by "consumption assigned" divided by "claimed storage", application efficiency is defined as "storage used" divided by "consumption assigned", and overall utilization is defined as "used" divided by "logical volume."

Preferably, the KPIs are displayed together with the storage categories in a convenient graphical or tabular format. Exemplary sets of KPIs embody novel approaches to evaluating storage performance in systems such as SAN and NAS systems. By categorizing the storage data and providing a novel set of KPIs that are continuously monitorable and updated on a daily basis, the storage system efficiency and weak points can be evaluated in a novel manner, so that specific portions of the storage estate can be focused on for improvement, and reallocation and reconfiguration of resources can be performed in a timely manner.

In accordance with embodiments of the present invention, a set of KPIs and a cascading display of storage categories is used to identify factors for improvement in storage efficiency, for example, in overall utilization. Factors that contribute largely to a reduction in utilization of storage can be readily identified by a user accessing a web storage tool and provided with storage data in the form of the cascading display and series of KPIs.

DETAILED DESCRIPTION OF THE INVENTION

The present invention relates to systems and methods of storage estate management. Embodiments of the present invention are applicable to organizations that deploy SAN, NAS, combinations of SAN and NAS storage, and other storage technology to house data. The term "storage estate", as used herein, generally refers to hardware and software used to store data within an organization. The storage estate of a medium-sized or large organization often includes heterogeneous storage systems, including direct attached, network attached storage (NAS), storage area networks (SAN), and other systems that employ different architectures. In addition, each type of storage architecture may consist of hardware and/or software provided by more than one vendor. Accordingly, the management of the storage estate can be exceedingly complex.

Embodiments of the present invention provide novel systems and methods for managing the storage estate of an organization. In particular, novel monitoring systems and methods are provided that facilitate better management and more efficient deployment of storage resources.

Figure 1:
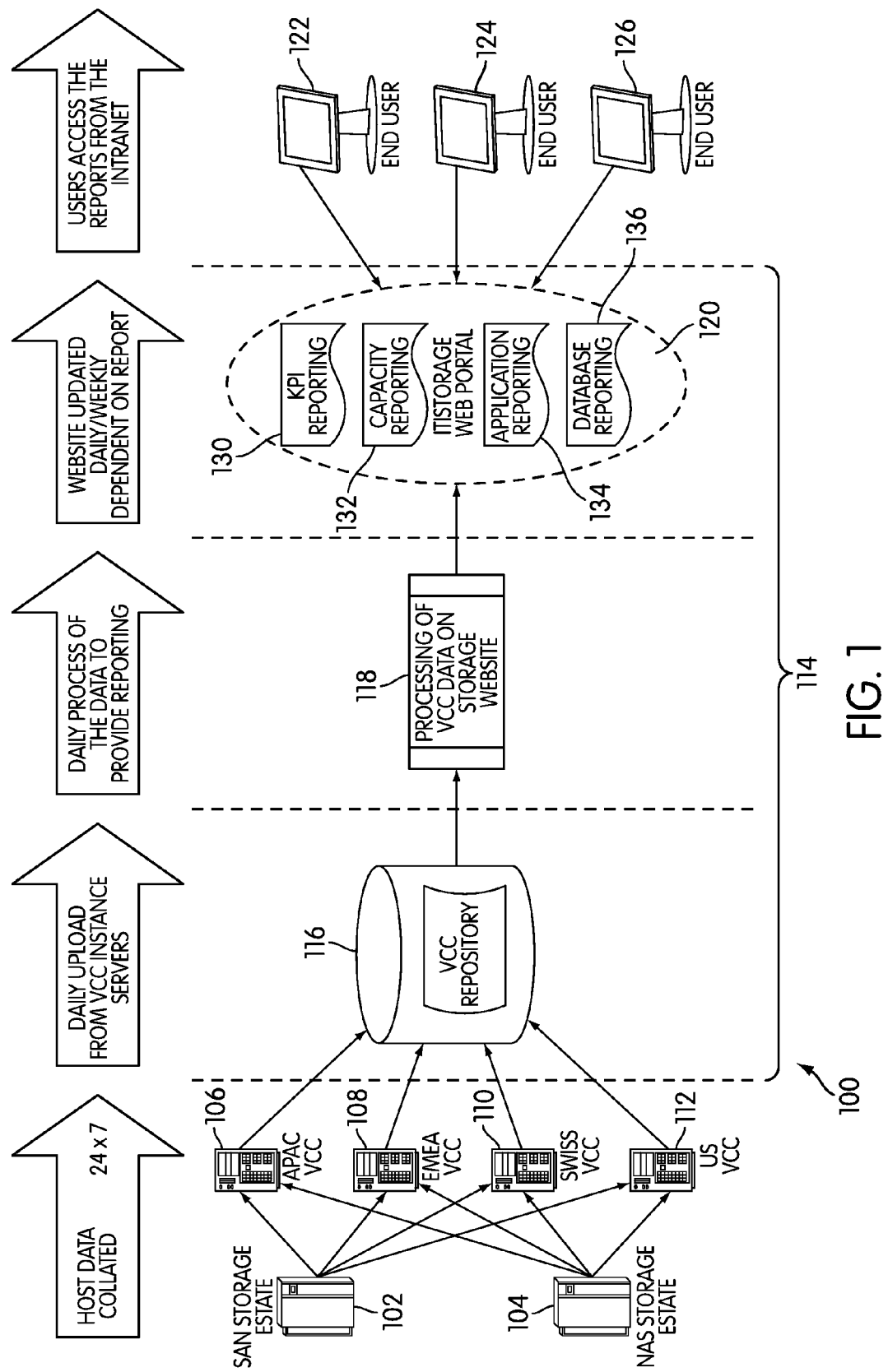
FIG. 1 is a schematic drawing that depicts elements of a data storage management system in accordance with an embodiment of the present invention.

FIG. 1 is a schematic drawing that depicts elements of a data storage management system 100 in accordance with an embodiment of the present invention. As depicted in FIG. 1, system 100 includes a NAS storage estate 104 and a SAN storage estate 102 associated with an organization. In other embodiments of the present invention, other components of a storage estate are possible. It will be understood that the storage estates 102, 104 represent schematically a sum of data storage components that may be deployed over various sites within a building or over a large geographical region. For example, the SAN and NAS storage estate could each comprise a plurality of respective devices that each includes an agent responsible for regularly updating servers 106-112 with information related to the storage estate. Servers 106-112 can be, for example, instance servers, such as Veritas Command Central™ (VCC) servers.

In the embodiment of the invention depicted in FIG. 1, data report servers (or "data servers") 106, 108, 110, and 112 are each dedicated to receiving geography-specific information from SAN and NAS storage estates 102 and 104. For example, server 106 receives storage estate information from data storage components deployed in the Asia Pacific region, server 108 receives storage estate information from storage components deployed in the Europe Middle East Africa region, etc. As such, servers 106-112 need not be located in the same place. However, in other embodiments of the present invention, data servers can be arranged to receive storage estate information in any convenient manner. In one embodiment of the present invention, servers 106-112 are "blade" servers. As described further below, servers 106-112 receive information from respective storage estate components that can be used to provide users with reports and other means of representing the status of data storage within the storage estate. Preferably, information from the data servers is uploaded daily to storage web tool 114 that includes data repository 116.

In one embodiment of the present invention, daily repository data is periodically processed by processor (web reporting tool) 118, which can be a separate server, in order to provide relevant information concerning the storage estate to an end user. Preferably, the web reporting tool is associated with a storage website 120.

In a preferred embodiment of the present invention, website 120 is provided to authorized users 122, 124, 126 of an organization who can access the website from any geographical location. For example, website 120 could be part of a company intranet that is accessible at business locations or more generally through proprietary software and/or access codes.

As depicted in FIG. 1, website 120 is configured to provide a series of reports to a user accessing the website. Such reports include KPI reports 130, capacity reports 132, application reports 134, and database reports 136. Reports 130-136 constitute information about current or historical state of the organization's storage estate organized according to specific protocols. As discussed further below, in accordance with embodiments of the present invention, KPI reports provide in graphical, tabular or text format a summary of key performance indicators (KPIs) that can help a user monitor the storage estate.

In one embodiment of the present invention, the web reporting tool includes a website that provides a user interface that organizes storage data in a graphical and tabular format associated with KPIs.

Figure 2:
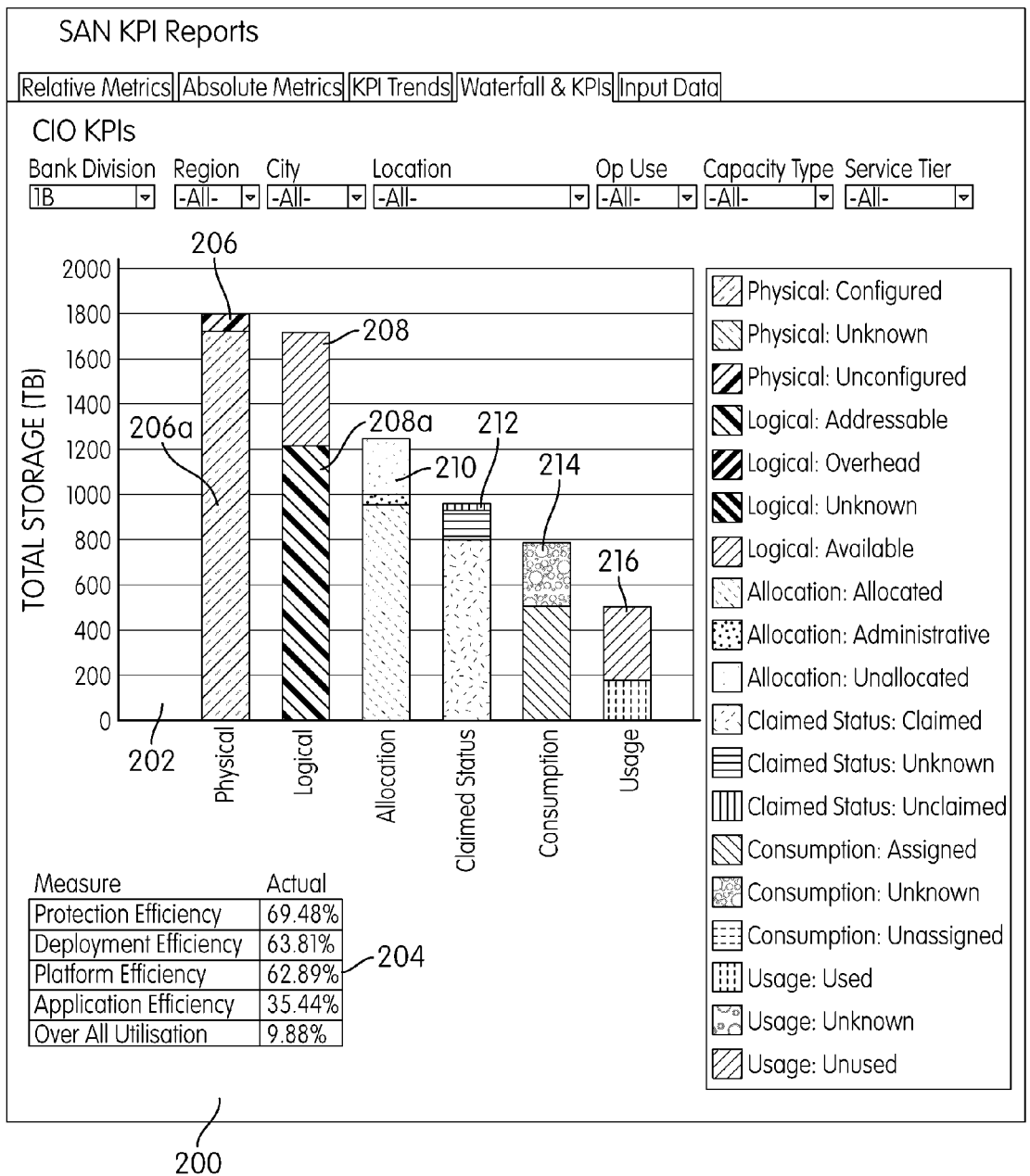
FIG. 2 depicts an exemplary storage data report according to an embodiment of the present invention.

In one embodiment of the present invention, a user accessing website 120 is provided with options to view KPI-related data. As depicted in FIG. 2, the KPI-related data can be presented on a display in a plurality of formats. FIG. 2 depicts an exemplary storage data report 200 that includes both a graphical chart 202 and tabular field 204 that each contain data related to key performance indicators. In accordance with embodiments of the present invention, key performance indicators constitute ratios of selected categories of data storage, as defined further below.

Report 200 is designed to provide to a user data related to a plurality of storage categories in a format that is both quantitative and can be used to readily compare categories of data. Chart 202 presents a series of histograms that denote different storage categories from which KPIs are derived. As described further below, chart 202 is organized as a cascading chart in which each histogram comprises a portion of the histogram(s) to the left. Thus, a user viewing chart 202 is readily apprised of the relation between different storage categories by the visual appearance and interrelation of the histograms.

In addition, tabular area 204 provides a quantitative listing of the value of selected KPIs. Such KPIs are preferably determined from categories of storage that are displayed in chart 202. For example, a particular sample KPI might represent the ratio of two different storage categories that are represented by the ratio of histogram 206 to histogram 208. Tabular area 204 presents the sample KPI as a percentage value that can be stored and used to track the change of that KPI over time.

In many cases, the KPIs are arranged to represent a value that is less than one, that is, a percentage that is less than 100%. The cascade chart 202 and KPIs are typically derived to show the relation between categories of storage estate that reflect the loss of usable storage capacity due to various factors. For example, as explained further below, the leftmost histogram 206 in chart 202 may represent total physical storage in the organization's storage estate. The rightmost histogram 216 may represent actually used storage. A user can thus be apprised qualitatively and quantitatively as to the relation between used storage and total storage. A series of categories represented by histograms 208 through 214 (as well as sub-categories therein) may represent different components of the storage estate. Thus, each KPI, by indicating a value for a ratio between different storage components, may provide insight into what storage components or sub-components are most associated with the reduction in storage that results in the volume of actual storage use depicted in the rightmost histogram.

In some cases, KPIs may represent ratios of storage sub-categories within a storage category. For example, a KPI might compare the storage overhead to actual storage allocated for use within a storage category. In such cases, the KPIs may have ratios that are greater than one, e.g., the overhead could theoretically be greater than the used storage.

Accordingly, each KPI can be displayed to a user as a number, such as a fractional or decimal value (e.g., 0.6) representing the ratio of the relevant components of the storage estate that define the KPI, and in addition the KPI can be represented by highlighting the relevant histograms or sub-histograms corresponding to those components of the storage estate, as illustrated with respect to FIGS. 3a-3d and 4a-4d discussed further below.

Thus, a user accessing storage web tool 114 is provided with graphical and tabular data that can be organized according to different categories of the storage estate. In one example, web tool 114 is configured to produce a page 200 that has user-selectable fields so that a user can display reports in chart 202 and table 204 for different storage architecture within the storage estate, such as SAN and NAS, as well as reports derived as a function of geographic region, city location, division within an organization, storage capacity type (dedicated vs. shared devices), operational use (e.g., production versus development), service tier (e.g., gold, silver, or bronze), etc.

In a preferred embodiment of the present invention, chart 202 comprises a set of storage categories where each category contains sub-categories, in which the chart is arranged according to a storage capacity hierarchy. In the particular example shown in FIG. 2, chart 202 represents a graph of the SAN storage components associated with an organization's storage estate.

Preferably, a first storage category (or histogram) 206 comprises a first total storage capacity (or volume) and includes a plurality of sub-categories that together comprise the total storage capacity of the first storage category. For example, histogram 206 may represent the total SAN storage capacity of an organization.

Storage category 208 comprises a second total storage capacity that is equivalent to the total storage capacity of a sub-category of histogram 206. Thus, the second storage category 208 is equivalent in capacity to a sub-category 206a of the first storage category 206. Similarly, the third storage category 210 comprises a total storage capacity that is equivalent to the total storage capacity of a sub-category 208a of the second category 208.

In one example, the categories 206, 208, 210, 211, 214 and 216 for a SAN storage report are, respectively, "physical storage", "logical storage", "allocated storage", "claimed storage", "storage consumption", and "storage usage." Each category, such as "physical storage", is subdivided into various sub-categories that each comprise a sub-portion of the respective histogram and each subcategory denotes a volume of storage that is a sub-type of "physical storage", for example, "physical configured" and "physical unconfigured." Thus, in one example, the category of "logical" storage of the SAN estate, represented by histogram 208, is equivalent to the physical configured sub-category 206a.

Figure 5:
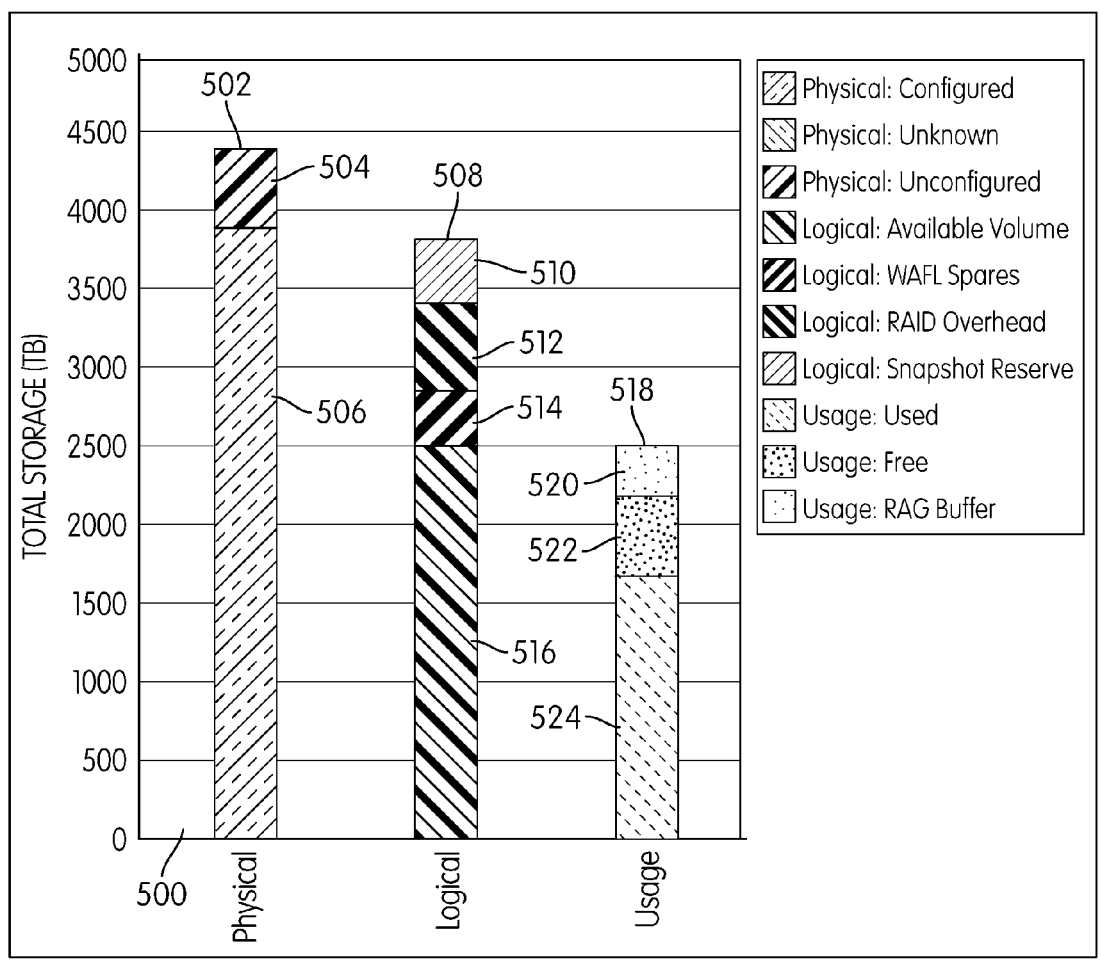
FIG. 5 depicts an exemplary storage data report according to another embodiment of the present invention.

A similar type of data report to that shown in FIG. 2 can be prepared based on data from other components of a storage estate, such as that collected from NAS storage, as depicted in FIG. 5. In addition to a graphical display, such as the histogram display, the data report corresponding to other components of the storage estate (that is, other than the SAN-based data depicted in FIG. 2) can contain a set of KPIs displayed in a table (not shown) similar to table 204, wherein the tabular data corresponds to the particular storage architecture shown in corresponding histogram charts of the data report.

Referring again to FIG. 2, preferably, a first storage category (or histogram) 206 comprises a first total storage capacity (or volume) and includes a plurality of sub-categories that together comprise the total storage capacity of the first storage category. For example, histogram 206 may represent the total SAN storage capacity of an organization.

Storage category 208 comprises a second total storage capacity that is equivalent to the total storage capacity of a sub-category of histogram 206. Thus, the second storage category 208 is equivalent in capacity to a sub-category 206a of the first storage category 206. Similarly, the third storage category 210 comprises a total storage capacity that is equivalent to the total storage capacity of a sub-category 208a of the second category 208.

In one example, the categories 206, 208, 210, 211, 214 and 216 for a SAN storage report are, respectively, "physical storage", "logical storage", "allocated storage", "claimed storage", "storage consumption", and "storage usage." Each category, such as "physical storage", is subdivided into various sub-categories that each comprise a sub-portion of the respective histogram and each subcategory denotes a volume of storage that is a sub-type of "physical storage", for example, "physical configured" and "physical unconfigured." Thus, in one example, the category of "logical" storage of the SAN estate, represented by histogram 208, is equivalent to the physical configured sub-category 206a.

Referring again to FIG. 5, preferably, a first storage category (or histogram) 502 comprises a first total storage capacity (or volume), which may reflect the total NAS storage estate of an organization. Storage category 502 includes one or more sub-categories, including "physical configured" storage 506 and "physical unconfigured" storage 504, which together comprise the total storage capacity of the first storage category 502, in this case, the total NAS storage capacity.

Storage category 508 comprises a second total storage capacity that is equivalent to the total storage capacity of a sub-category of histogram 502. Thus, the second storage category, in this case, "logical storage", is equivalent in capacity to "physical configured" storage category 506. "Logical storage" category 508 can comprise sub-categories "available volume" 516, "WAFL spares" 514, "RAID overhead" 512 and "snapshot reserve" 510. Similarly, the third storage category "usage" 518 comprises a total storage capacity that is equivalent to the total storage capacity 516, "logical available volume." "Usage" category 518 can comprise sub-categories "used" 524, "free" 522, and a buffer, such as "RAG buffer" 520.

As mentioned above, aspects of the present invention involve selection and display of key performance indicators that assist a user in monitoring the storage estate of an organization. Although performance metrics in general are used by many organizations, embodiments of the present invention discussed below include novel KPIs that facilitate management of an organization's resources by providing insight into the relation between select storage categories, particularly those in SAN and NAS storage. As mentioned above, in preferred embodiments of the present invention, each KPI represents a ratio of one type of storage category (or sub-category, or combination of storage categories/subcategories) to another storage category. In a preferred embodiment of the present invention, web reporting tool 118 is configured so that the individual components of KPIs can be graphically represented in a chart similar to chart 202. Below are described exemplary KPIs arranged according to storage architecture type. FIGS. 3a-3d and 4a-4d provide exemplary graphical representations of the corresponding KPIs. In preferred embodiments of the present invention, a graphical means of highlighting each component of a KPI is provided in a KPI report, as illustrated in FIGS. 3a-3d and 4a-4d. Thus, a KPI report may include, in addition to a table listing the value of an individual KPI metric (%), a graphical highlighting of the storage volume associated with each individual component of the KPI, as illustrated below.

SAN KPIs

Figure 3A:
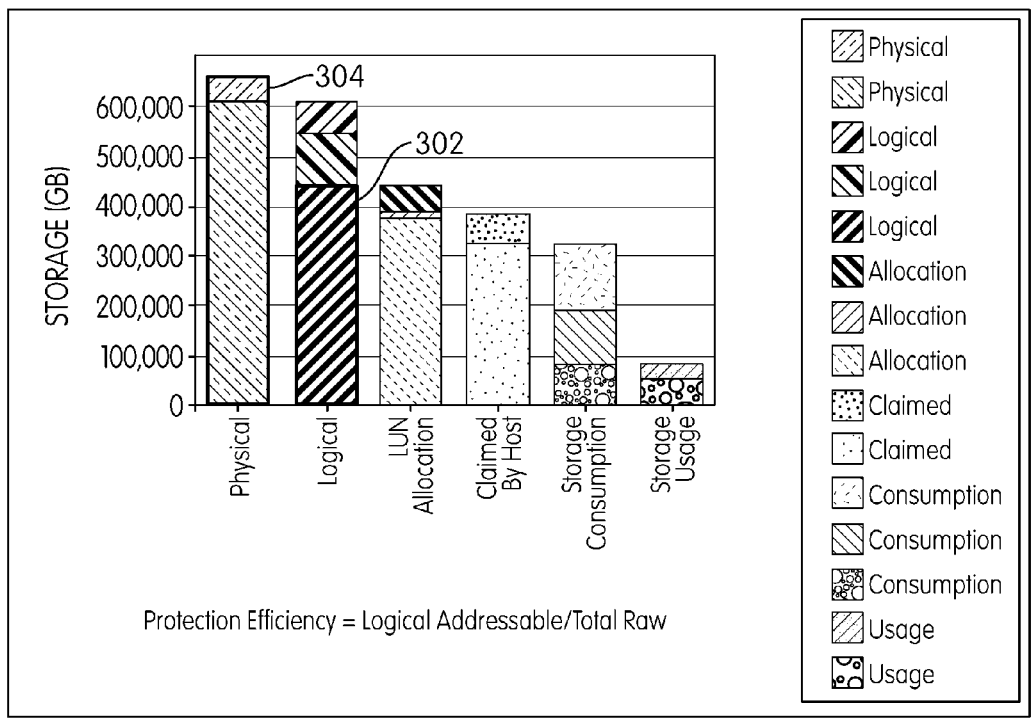
FIGS. 3a-3d and 4a-4d provide exemplary graphical representations of KPIs in accordance with embodiments of the present invention.

Protection Efficiency—The protection efficiency KPI is a novel metric that represents the ratio of logical addressable storage volume 302 to the total physical volume 304 of the SAN storage estate, as shown in FIG. 3a. The protection efficiency KPI is a measure of the percent of disk capacity that remains after the provision of resilience against a disk failure through use of RAID (redundant array of independent drives) and spares policies. Thus, lower protection efficiency indicates that relatively more storage volume is allocated toward the provisions for disk resilience and fault tolerance.

Figure 3B:
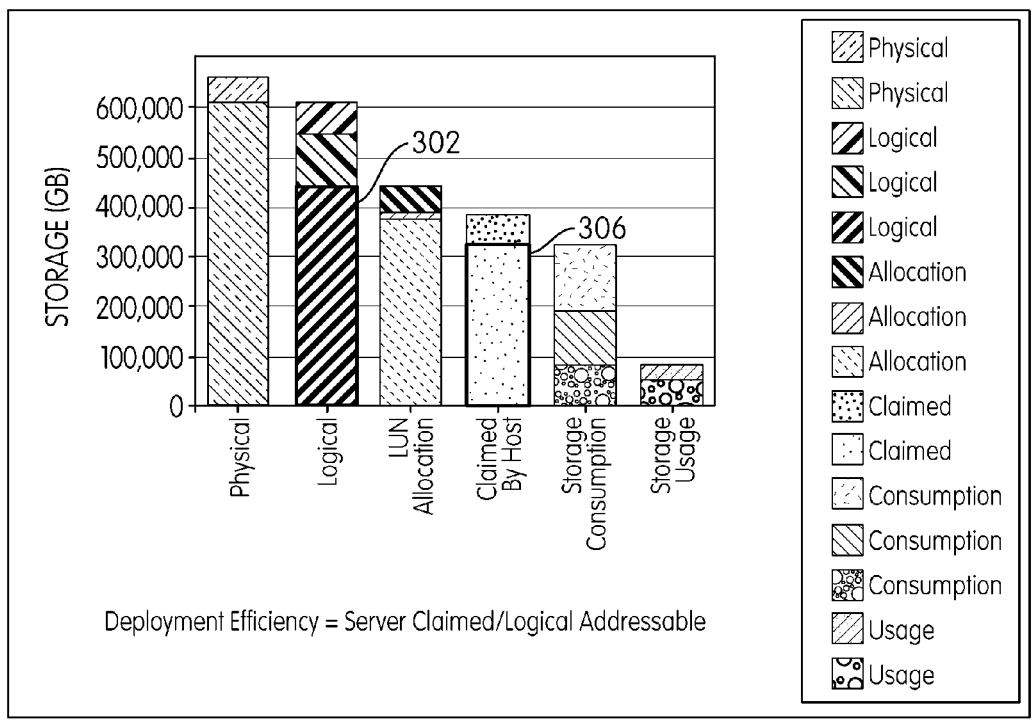

Deployment Efficiency—As illustrated in FIG. 3b, the deployment efficiency represents the fraction of storage that is claimed by a server for use 306 compared to the total logical addressable storage 302. The deployment efficiency thus is a measure of the percent of RAID protected disk storage that is assigned for use by end user devices (servers), with the remaining storage held back from assignment so that it can be used, for example, for growth in the storage estate.

Figure 3C:
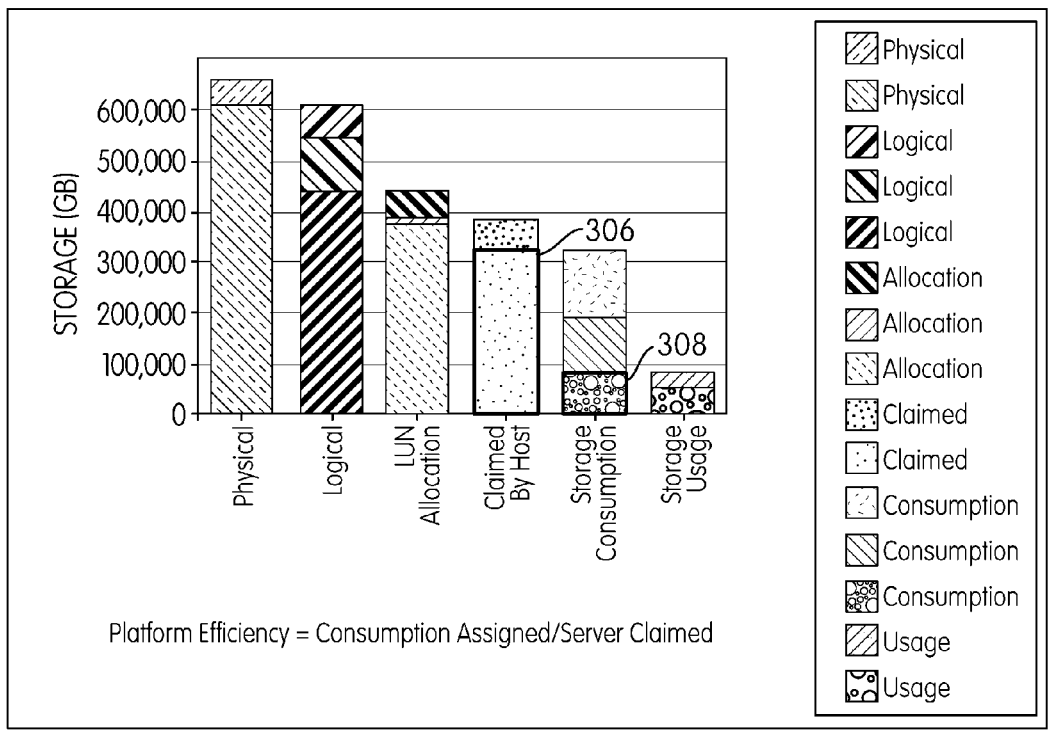

Platform Efficiency—As depicted in FIG. 3c, the platform efficiency represents the fraction of deployed storage 306 that is allocated for use 308 on end user devices as filesystems or database tablespaces.

Figure 3D:
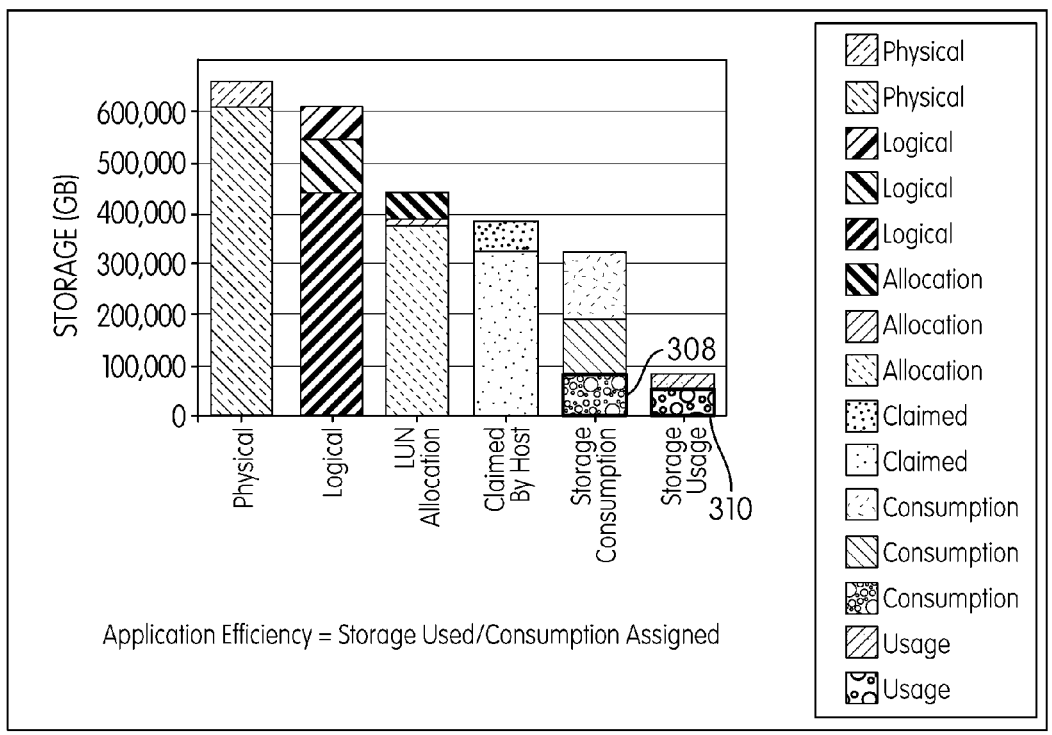

Application Efficiency—As depicted in FIG. 3d, the novel metric application efficiency represents the fraction of disk storage allocated to the end user devices 308 that is actually used by the end user device 310.

Overall KPI Efficiency—The objective of the overall KPI efficiency metric is to measure the overall efficiency of the storage device, that is, a percent of used disk storage 310 as compared to the overall capacity 304.

NAS KPIs

Figure 4A:
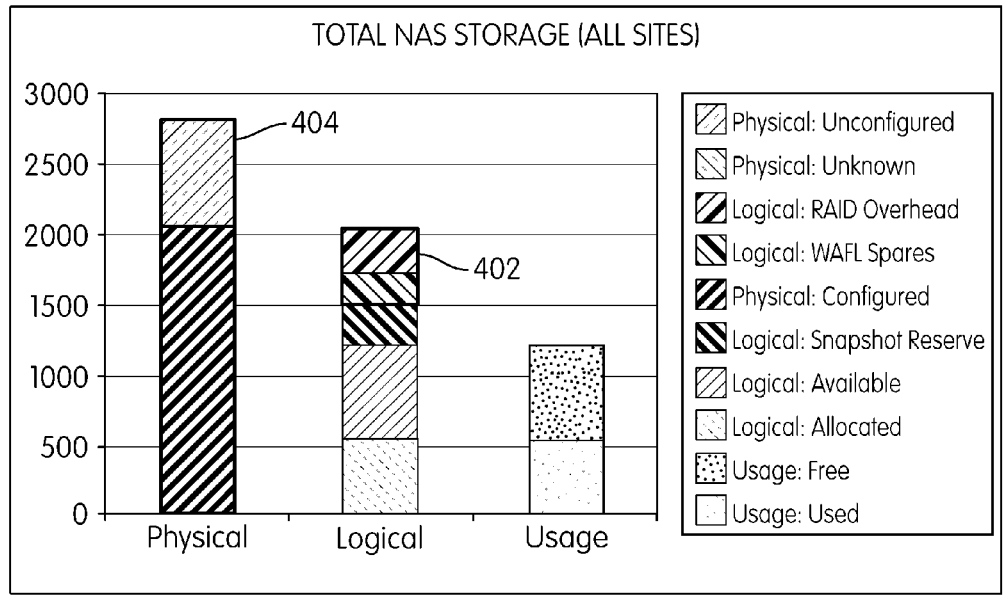

Protection Overhead—In a preferred embodiment of the present invention, protection overhead is included as a KPI in the NAS storage report. As illustrated in FIG. 4a, the protection overhead measures the fraction of storage space allocated for protection 402 through use as RAID or spares, for example, compared to the total disk storage of the NAS storage estate 404. As such, the protection overhead is complementary to protection efficiency, which is a measure of the total disk space remaining after protection overhead is used.

Figure 4B:
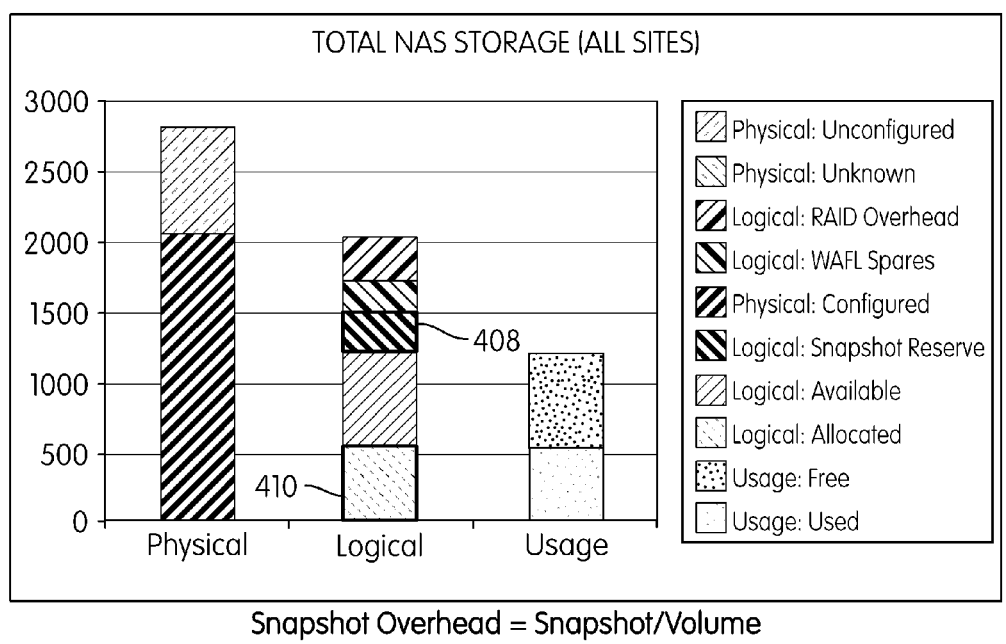

Snapshot Overhead—As illustrated in FIG. 4b, the novel metric of snapshot overhead represents the ratio of the amount of storage allocated for use as replicated copies of the data (snapshot) 408 compared to the allocated storage 410. Thus, a high snapshot overhead indicates that a larger percentage of disk space is used for snapshot copies as opposed to allocated storage.

Figure 4C:
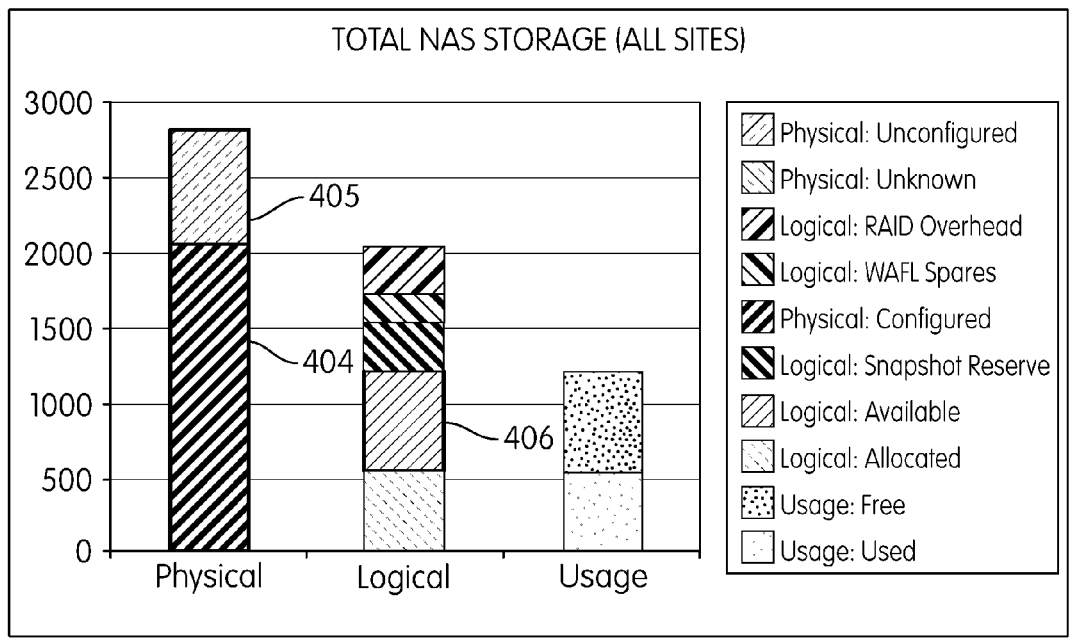

Deployment Overhead—In a preferred embodiment of the present invention, deployment overhead is included as a KPI in the NAS storage report. FIG. 4c shows that the deployment overhead measures the relative ratio of the sum of unconfigured storage 405 and available storage 406 as compared to the total physical storage 404 of the storage estate. It is desirable that this ratio be kept relatively low.

Figure 4D:
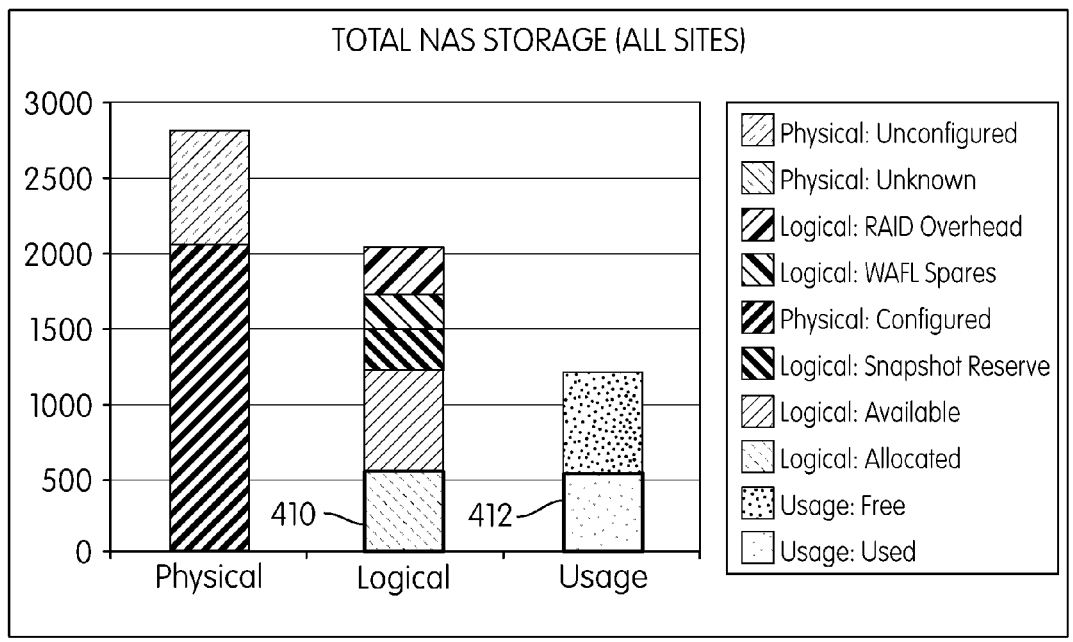

Application Efficiency—As illustrated in FIG. 4d, the application efficiency in a NAS storage estate represents the percentage of disk storage used by the end user 412 device versus disk storage allocated 410.

Overall KPI Efficiency—Preferably, overall KPI efficiency is measured similarly to that for NAS storage.

In sum, using a combination of metrics, such as the SAN and NAS KPIs described above, system 100 provides a method for monitoring and analyzing how the storage in a storage estate is utilized. In a preferred embodiment of the present invention, the production of the KPI metrics is executed on a daily basis. Thus, a user accessing website 120 is automatically provided with KPI-related data that is updated on a daily basis. In one configuration of the invention, storage estate data provided by a central storage tools is collated and downloaded once a day into a central data repository 116. The data is then processed on server 118 to produce reports 200 viewable on website 120 that include a cascading view of the storage estate that can be termed a "KPI waterfall" (see chart 202), as well as tabulation of individual KPI values (see table 204). This report can be made available to authorized users within an organization to show the level of efficiency and identify possible problem areas within the storage estate.

In one embodiment of the present invention, the KPI data collected as described above can be combined with data from existing systems, e.g., inventory management systems and "business intelligence" to provide a methodology to save costs and improve overall asset efficiency. Improved use of the existing storage assets from the detailed understanding derived from the novel set of KPIs provided in a web reporting tool can significantly reduce the need to procure raw storage capacity at levels previously required to meet capacity demand growth. For example, based on information supplied by KPI data, an organization can target specific aspects of the storage estate for improvement in order to increase overall efficiency over time.

Thus, the present invention provides systems and methods that improve storage estate management by apprising in a convenient manner a user or organization of the components of the storage estate requiring attention, by providing a set of novel KPIs constructed from the components. The novel set of KPIs is designed to highlight the status as well as possible problems of the storage estate in a new manner.

In one example, the protection efficiency expresses the ratio of logical addressable storage to total physical storage in the SAN storage estate. This ratio represents a measure of the percent of the total SAN storage disk capacity that remains after the provision for resilience against disk failure by use of RAID technology and spares. Thus, if the system reports a low protection efficiency, for example, for the South America geographic region, the RAID and spares components in the region are flagged for scrutiny, since the low protection efficiency indicates that relatively more storage volume of the SAN storage estate is taken up by the provisions for disk failure backup. This might result, for example, in the organization taking steps to reconfigure the provisions in the RAID protocol for the South America region.

In another example, the snapshot overhead expresses the ratio of the amount of storage in the NAS storage estate that is provided for use as replicated copies of data as compared to the amount of storage that is allocated to hosts. Both of these components comprise sub-categories of the NAS logical storage, which corresponds to the total amount of physical configured disk space of the NAS storage estate. Thus, whatever the total amount of configured NAS disk space, when snapshot overhead becomes high, a user is apprised of the fact that a relatively larger amount of the configured NAS storage estate is being used for snapshot copies as opposed to use by hosts. This may result in the organization taking steps to improve the volume of storage allocated to hosts, or improve the snapshot storage system.

A storage snapshot generally refers to a set of reference markers, or pointers, to data stored, for example in a storage estate. Although a snapshot may be somewhat analogous to a detailed table of contents of the storage estate, there are different types of known storage snapshot technologies. A so-called copy-on-write snapshot utility creates a snapshot of changes to stored data every time new data is entered or existing data is updated. This allows rapid recovery of data in case of a disk write error, corrupted file, or program malfunction and requires relatively less storage volume. A so-called split-mirror snapshot utility references all the data on a set of storage drives. Every time the utility is run, a snapshot is created of the entire volume, not only of the new or updated data. This makes it possible to access data offline, and simplifies the process of recovering, duplicating, or archiving all the data on a drive. However, this is a slower process, and it requires relatively more storage space for each snapshot as compared to copy-on-write snapshots. Thus, depending on whether one type of snapshot technology or another, or a mix of technologies is used in a NAS storage estate, the snapshot overhead might vary from several percent to over one hundred percent. A large increase in the snapshot overhead, for example, for the European geographic region, might trigger changes in the snapshot technology mix used. For example, a decrease in the efficiency of write-on-copy snapshot technology might be suspected as the cause of an increase in overall snapshot overhead, triggering scrutiny of that snapshot technology.

Table I below is an example of improvements in KPI metrics over an approximate one year time frame, which reflects the increase in storage efficiency of a SAN storage estate using the systems and methods of the invention described above. Notably, protection efficiency, deployment efficiency, and platform efficiency were improved substantially, resulting in a threefold increase in overall efficiency.

TABLE I

| SAN KPIs Month 1 | | SAN KPIs Month 12 | |
|---|---|---|---|
| Protection | 63% | Protection | 72% |
| Deployment | 61% | Deployment | 68% |
| Platform | 35% | Platform | 87% |
| Application | 44% | Application | 41% |
| Overall | 6% | Overall | 18% |

In other embodiments of the present invention, functionality can be provided by system 100 to introduce historical trend/prediction reporting of storage estate parameters, in conjunction with mapping of storage cost to the data provided to the end user. This additional functionality can thereby enable business decisions to be made based on data provided concerning current and future use of storage assets.

The steps described herein are performed using general purpose information technology infrastructure that is programmed to function as described herein. Those skilled in the art will appreciate that the information technology infrastructure required to perform the steps herein includes, in addition to those components specifically described above, among other things, communications equipment, one or more databases for storage, and software engines and processors for performing the steps as described.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM, etc.) as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for management of a storage estate of an organization, comprising:
    a storage management data repository configured to receive periodic updates from one or more servers or applications coupled to the storage estate; and
    a web reporting tool configured to periodically process data from the storage management data repository, the web reporting tool configured to provide one or more reports related to the storage estate in a format accessible through a web interface provided to authorized users, the one or more reports including a key performance indicator (KPI) report,
    wherein the KPI report comprises one of a SAN KPI report and a NAS KPI report,
    wherein the SAN KPI report comprises a display of one or more SAN KPIs related to storage area network (SAN) data of the organization,
    wherein the NAS KPI report comprises a display of one or more NAS KPIs related to network attached storage (NAS),
    wherein at least one SAN KPI comprises one or more of:
        protection efficiency calculated as a ratio of logical addressable data storage volume to total physical volume of data storage for storage area network data of the organization, and
        application efficiency calculated as a fraction of disk storage allocated to end user devices that is actually used by the end user devices,
    wherein at least one NAS KPI comprises snapshot overhead calculated as a ratio of a volume of storage allocated for replicated copies of data to allocated storage.

2. The system of claim 1, wherein the KPI report comprises a graphical display of current data related to a plurality of storage categories, each storage category comprising one of a subset of storage area network storage and a subset of network attached storage.

3. The system of claim 2, wherein the plurality of storage categories are displayed as a series of histograms that each comprises one or more sub-histograms corresponding to respective storage sub-categories, the histograms being arranged in a storage capacity hierarchy,
    wherein a first storage category comprises a first total storage capacity and includes a plurality of sub-categories that together comprise the first total storage capacity of the first storage category, and a second storage category comprises a second total storage capacity,
    wherein a relationship between the first and second storage categories is that the second total storage capacity is equivalent to a total storage capacity of a sub-category of the first category,
    wherein the relationship between the first and second storage categories is repeated for one or more additional storage categories successive to the second storage category.

4. The system of claim 3, wherein each storage category comprises a category of storage area network storage,
    wherein the plurality of storage categories comprises physical storage, logical storage, allocated storage, claimed storage, storage consumption, and storage usage,
    wherein physical storage denotes total actual storage capacity of the storage area network,
    wherein logical storage denotes a subset of physical storage that is configured and formatted storage,
    wherein allocated storage denotes a subset of logical storage that is addressable,
    wherein claimed storage denotes a subset of allocated storage that is allocated to host devices,
    wherein storage consumption denotes a subset of claimed storage that has been claimed by a host device,
    wherein storage usage denotes a subset of consumption storage a subset of storage consumption that has been claimed by a host device; and
    wherein one or more KPIs is displayed in graphical form by highlighting components of the KPI, each component comprising a histogram or sub-histogram corresponding to a respective displayed storage category or sub-category.

5. The system of claim 3, wherein each storage category comprises a category of network attached storage,
    wherein the plurality of storage categories comprise physical storage, logical storage, and storage usage,
    wherein physical storage denotes total actual storage capacity of the storage area network,
    wherein logical storage denotes a subset of physical storage that is configured and formatted storage,
    wherein storage usage denotes a subset of logical storage that is one of allocated and written to and allocated and not written to, and
    wherein one or more KPIs is displayed in graphical form by highlighting components of the KPI, each component comprising a histogram or sub-histogram corresponding to a respective displayed storage category or sub-category.

6. The system of claim 1, wherein the one or more servers comprise a plurality of servers, each server configured to receive information from a subset of the storage estate, the subset arranged according to one or more of a geographical location, a type of storage, a type of business, and a city,
    wherein the one or more reports further comprise a capacity report, an application report, and a database report.

7. A method for managing a storage estate of an organization, comprising:
    regularly retrieving information related to the storage estate at one or more servers;
    forwarding periodically the retrieved information from the one or more servers on to a data repository;
    processing the periodically forwarded data in the data repository on a regular basis to provide processed information related to categories of the storage estate; and
    providing one or more reports related to the storage estate in a format accessible through a web interface provided to authorized users, the one or more reports including a key performance indicator (KPI) report,
    wherein the KPI report comprises one of a SAN KPI report and a NAS KPI report,
    wherein the SAN KPI report comprises a display of one or more KPIs related to storage area network (SAN) data of the organization,
    wherein the NAS KPI report comprises a display of one or more KPIs related to network attached storage (NAS), wherein at least one SAN KPI comprises one or more of:
protection efficiency calculated as a ratio of logical addressable data storage volume to total physical volume of data storage for storage area network data of the organization, and
application efficiency calculated as a fraction of disk storage allocated to end user devices that is actually used by the end user devices,
wherein at least one NAS KPI comprises snapshot overhead calculated as a ratio of a volume of storage allocated for replicated copies of data to allocated storage.

8. The method of claim 7, wherein the KPI report comprises a graphical display of current data related to a plurality of storage categories, each storage category comprising one of a subset of storage area network storage and a subset of network attached storage.

9. The method of claim 8, wherein the plurality of storage categories are displayed as a series of histograms that each comprises one or more sub-histograms corresponding to respective storage sub-categories, the histograms being arranged in a storage capacity hierarchy,
wherein a first storage category comprises a first total storage capacity and includes a plurality of sub-categories that together comprise the first total storage capacity of the first storage category, and a second storage category comprises a second total storage capacity,
wherein a relationship between the first and second storage categories is that the second total storage capacity is equivalent to a total storage capacity of a sub-category of the first category, and
wherein the relationship between the first and second storage categories is repeated for one or more additional storage categories successive to the second storage category.

10. The method of claim 9, wherein each storage category comprises a category of storage area network storage,
wherein the plurality of storage categories comprises physical storage, logical storage, allocated storage, claimed storage, storage consumption, and storage usage,
wherein physical storage denotes total actual storage capacity of the storage area network,
wherein logical storage denotes a subset of physical storage that is configured and formatted storage,
wherein allocated storage denotes a subset of logical storage that is addressable,
wherein claimed storage denotes a subset of allocated storage that is allocated to host devices,
wherein storage consumption denotes a subset of claimed storage that has been claimed by a host device,
wherein storage usage denotes a subset of consumption storage a subset of storage consumption that has been claimed by a host device; and
wherein one or more KPIs is displayed in graphical form by highlighting components of the KPI, each component comprising a histogram or sub-histogram corresponding to a respective displayed storage category or sub-category.

11. The method of claim 9, wherein each storage category comprises a category of network attached storage,
wherein the plurality of storage categories comprise physical storage, logical storage, and storage usage,
wherein physical storage denotes total actual storage capacity of the storage area network,
wherein logical storage denotes a subset of physical storage that is configured and formatted storage, wherein storage usage denotes a subset of logical storage that is one of allocated and written to and allocated and not written to, and
wherein one or more KPIs is displayed in graphical form by highlighting components of the KPI, each component comprising a histogram or sub-histogram corresponding to a respective displayed storage category or sub-category.

12. The method of claim 7, wherein the one or more servers comprise a plurality of servers, each server configured to receive information from a subset of the storage estate, each subset arranged according to one or more of a geographical location, a type of storage, a type of business, a time interval, and a city;
wherein the KPI report is user configurable,
wherein one or more fields are provided in a user-accessible web format for user tailoring of the KPI report in accordance with user selection of information from the one or more subsets of the storage estate.

13. A method for managing a storage estate of an organization, comprising:
retrieving periodically a first set of information related to the storage estate at one or more servers;
processing the periodically retrieved information to depict a storage volume associated with each of a plurality of categories of the storage estate; and
identifying to a user a set of storage estate components for attention by providing at a web interface a set of key performance indicators (KPIs) related to the categories of the storage estate,
wherein the set of KPIs comprises a display of one or more KPIs related to one of a set of storage area network (SAN) KPIs and a set of network attached storage (NAS) KPIs,
wherein the set of SAN KPIs comprises a display of one or more KPIs related to SAN data of the organization,
wherein the set of NAS KPIs comprises a display of one or more KPIs related to NAS data,
wherein at least one SAN KPI comprises one or more of:
protection efficiency calculated as a ratio of logical addressable data storage volume to total physical volume of data storage for storage area network data of the organization, and
application efficiency calculated as a fraction of disk storage allocated to end user devices that is actually used by the end user devices,
wherein at least one NAS KPI comprises snapshot overhead calculated as a ratio of a volume of storage allocated for replicated copies of data to allocated storage.

14. The method of claim 13, further comprising, prior to the providing the set of KPIs, regularly retrieving information related to the storage estate at one or more servers linked to components of the storage estate; and processing the regularly retrieved information on a regular basis to produce regularly updated performance data related to the storage estate.

15. The method of claim 13, wherein the set of KPIs comprises a graphical display of current data related to a plurality of storage categories, each storage category comprising one of a subset of storage area network storage and a subset of network attached storage.

16. The method of claim 13, wherein the identifying the set of storage estate components is further based upon mapping of costs of components of the storage estate.

17. A method for managing a storage estate of an organization, comprising:

collecting historical performance data of the storage estate based at least in part on a set of key performance indicators (KPIs) related to storage data of the organization, wherein the set of KPIs comprises a display of one or more KPIs related to one of a set of storage area network (SAN) KPIs and a set of network attached storage (NAS) KPIs, wherein the set of SAN KPIs comprises a display of one or more SAN KPIs, wherein the set of NAS KPIs comprises a display of one or more NAS KPIs, wherein at least one SAN KPI comprises one or more of:
  protection efficiency calculated as a ratio of logical addressable data storage volume to total physical volume of data storage for storage area network data of the organization, and
  application efficiency calculated as a fraction of disk storage allocated to end user devices that is actually used by the end user devices, wherein at least one NAS KPI comprises snapshot overhead calculated as a ratio of a volume of storage allocated for replicated copies of data to allocated storage.

18. The method of claim 17, wherein the set of key performance indicators is provided in conjunction with a graphical display of historical performance data of the storage estate related to a plurality of storage categories, each storage category comprising one of a subset of storage area network storage and a subset of network attached storage.

19. The method of claim 18, wherein the plurality of storage categories is displayed as a series of histograms that each comprises one or more sub-histograms corresponding to respective storage sub-categories, the histograms being arranged in a storage capacity hierarchy, wherein a first storage category comprises a first total storage capacity and includes a plurality of sub-categories that together comprise the first total storage capacity of the first storage category, and a second storage category comprises a second total storage capacity, wherein a relationship between the first and second storage categories is that the second storage capacity is equivalent to a total storage capacity of a sub-category of the first category, and wherein the relationship between the first and second storage categories is repeated for one or more additional storage categories successive to the second storage category.

20. The method of claim 19, wherein each component of a key performance indicator is graphically highlighted as a histogram or sub-histogram.

* * * * *